(12) United States Patent
Baker

(10) Patent No.: US 10,974,804 B2
(45) Date of Patent: Apr. 13, 2021

(54) MAINTENANCE UNIT FOR AN INBOARD MARINE ENGINE

(71) Applicants: AQUADUK, INC., Panama (PA); Thomas G. Baker, Tracys Landing, MD (US)

(72) Inventor: Thomas G. Baker, Tracys Landing, MD (US)

( * ) Notice: Subject to any disclaimer, the term of this patent is extended or adjusted under 35 U.S.C. 154(b) by 217 days.

(21) Appl. No.: 15/318,548

(22) PCT Filed: Jun. 12, 2015

(86) PCT No.: PCT/US2015/035593
§ 371 (c)(1),
(2) Date: Dec. 13, 2016

(87) PCT Pub. No.: WO2015/192028
PCT Pub. Date: Dec. 17, 2015

(65) Prior Publication Data
US 2017/0121002 A1    May 4, 2017

Related U.S. Application Data

(60) Provisional application No. 62/095,256, filed on Dec. 22, 2014, provisional application No. 62/012,218, filed on Jun. 13, 2014.

(51) Int. Cl.
*B63H 21/38*  (2006.01)
*B63B 17/00*  (2006.01)
*F16K 21/18*  (2006.01)
*F16K 31/18*  (2006.01)

(52) U.S. Cl.
CPC ......... *B63H 21/38* (2013.01); *B63B 17/0027* (2013.01); *F16K 21/18* (2013.01); *F16K 31/18* (2013.01)

(58) Field of Classification Search
CPC . B63H 21/38; B63B 17/0027; B63B 2770/00; F01P 3/205
See application file for complete search history.

(56) References Cited

U.S. PATENT DOCUMENTS

| 1,523,062 | A | * | 1/1925 | Fleming | E03D 1/304 4/366 |
|---|---|---|---|---|---|
| 2,685,301 | A | | 8/1954 | Dreier | |
| 3,393,835 | A | * | 7/1968 | Kantor | B60P 3/426 222/105 |
| 4,291,836 | A | * | 9/1981 | Chen-Hsiung | A01G 27/001 137/132 |
| 4,574,399 | A | | 3/1986 | Sullivan | |

(Continued)

OTHER PUBLICATIONS

Search Report and Written Opinion of the International Search Authority in PCT/US2015/035593 dated Sep. 15, 2015; 14 pages.

*Primary Examiner* — Spencer E Bell
(74) *Attorney, Agent, or Firm* — Andrew D. Wright; Roberts Calderon Safran & Cole, P.C.

(57) ABSTRACT

A service unit including a vessel defining a chamber configured to receive fluid. A first conduit is coupled to the vessel and is in fluid communication with the chamber. The first conduit defines an inlet. A second conduit is coupled to the vessel and is in fluid communication with the chamber. The second conduit defines an outlet. The first conduit, the chamber, and the second conduit define a fluid passageway, and the fluid is unpressurized when in the chamber.

24 Claims, 10 Drawing Sheets

(56) References Cited

U.S. PATENT DOCUMENTS

| | | |
|---|---|---|
| 5,295,880 A | 3/1994 | Parker |
| 6,004,175 A | 12/1999 | McCoy |
| 6,206,740 B1 | 3/2001 | Sholler |
| 6,945,835 B1 | 9/2005 | Akhavein |
| 2011/0275258 A1 | 11/2011 | Hamlin |

* cited by examiner

MAINTENANCE UNIT FOR AN INBOARD MARINE ENGINE

This application claims priority to U.S. Provisional Patent Application No. 62/012,218, filed Jun. 13, 2014, and U.S. Provisional Patent Application No. 62/095,256, filed Dec. 22, 2014, the contents of both of which are incorporated by reference herein in their entirety.

BACKGROUND

The present invention relates to inboard marine engines. In particular, the invention relates to a service or maintenance unit for an inboard marine engine to preventing flooding of the engine.

Many inboard engines are positioned at or below the water line. Therefore, water, which is often used as a coolant, has to flow uphill through the engine for cooling purposes. When maintenance or winterization is necessary, people often erroneously attempt to couple a pressurized water source to the engine. The pressurized water source introduces water at a rate that is too fast for most inboard marine engine systems. Consequently, water ends up running back downhill (i.e., with gravity) into the engine, which causes appreciable damage, corrosing, and costing the owner both time and money for fixing the inboard marine engine.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
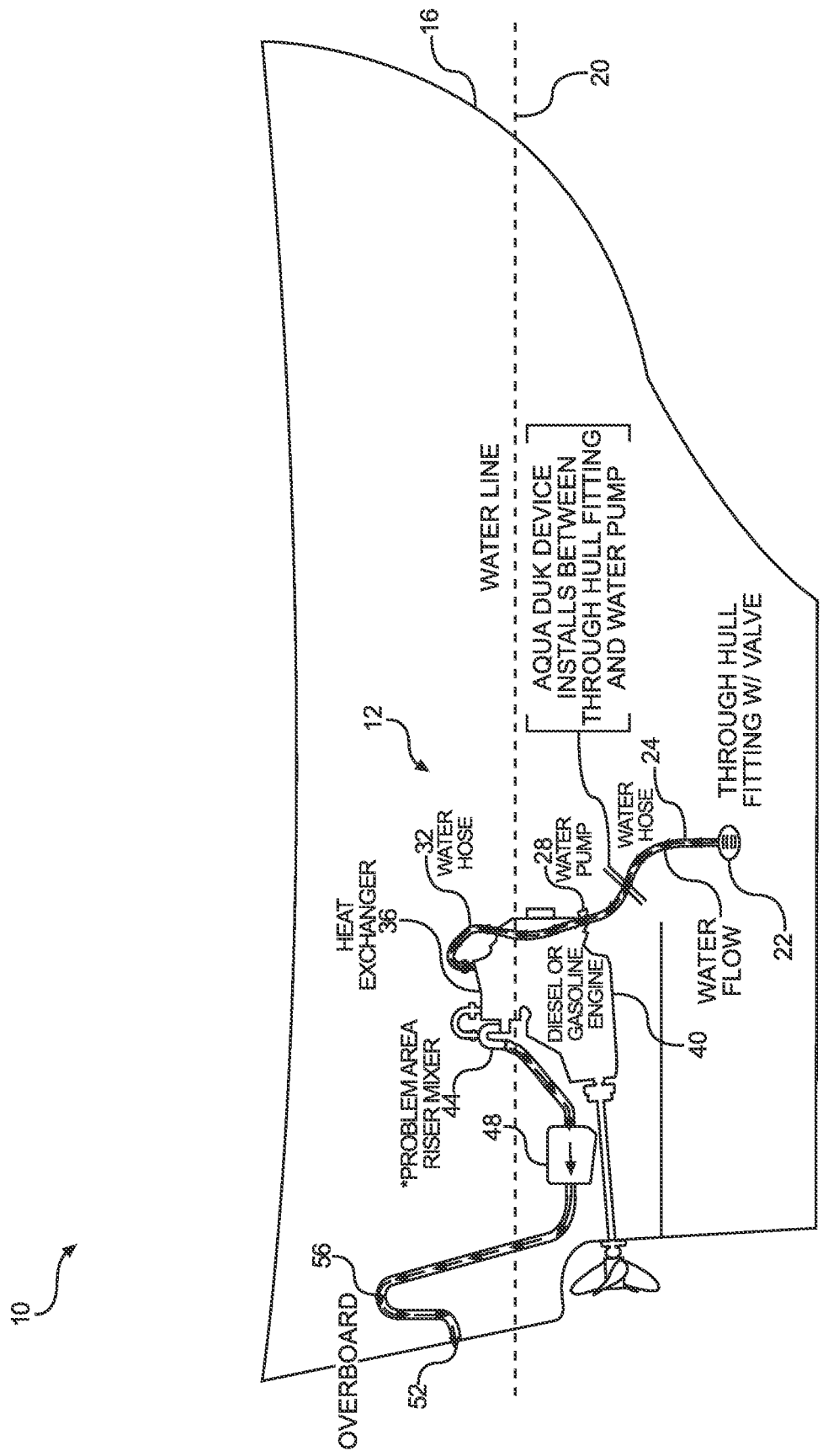
FIG. 1 is a schematic of an inboard marine engine.

FIG. 1 illustrates a boat 10 (e.g., sailboat) including an inboard marine engine systems 12. Many types of inboard marine engine systems are often positioned in a hull 16 of the boat 10 and therefore, are positioned below the water line 20. The exemplary inboard marine engine system 12, like most inboard marine engine systems, uses water from the ocean or lake as coolant. As illustrated in the inboard marine engine system 12 of FIG. 1, water is drawn in through an inlet 22 via a first or pickup water hose 24 by a pump 28. The water passes through the pump 28 to a second hose 32, which guides the water to a heat exchanger 36 and through an engine 40 to cool the interior of the engine 40. The engine 40 may be either diesel or gasoline. The water then passes through a manifold mixer 44 where it mixes with exhaust. The water/exhaust combination then moves through a lift muffler 48 that helps to move the water from the manifold mixer 44 upwards to an outlet 52 in the boat 10 via a fourth hose 56. Because the engine 40 is positioned below the water line 20, the water that is drawn in through the inlet 22 must move upwards against gravity through the engine 40 on route to the outlet 52. In order to prevent the water from moving backwards and into the engine 40, water must move through the system at a rate that is specific to the pump or the engine type. This rate is readily achievable when the boat is in water because the water source (e.g., the ocean or lake) is unpressurized. As such, the pump 28 dictates the intake of water through the inlet.

For example, a sailboat generally includes an engine system that includes a ½ inch pump to a ¾ inch pump, which means that the inlet and outlet diameters of the in-feed and out-feed tubing running to and from the engine, respectively, measure approximately ½ inch to ¾ inch. It should be understood that engine systems having pumps with alternative constructions and specifications may be employed. Additionally, the engine system and pump system may be suitable for any type of boat other than a sailboat. The rate of fluid through the engine system is specific to the type of engine system and pump. Therefore, each pump may move water through the system at different rates or a variety of rates. The rate of fluid through the system is dependent on several factors of the engine system. For example, the type of engine, the horsepower of the system, the pressure of the water, and the diameter of the in-feed/out-feed tubes are only a few of the factors that ensure that the rate of water through the system is appropriate. The types of pumps and relevant factors given above are merely exemplary and other engine types and configurations having other types of pumps may move water at rates that are dependent on a variety of other factors than those discussed above.

In some cases, the boat 10 does not have access to unpressurized water. For example, during winterization or servicing, the engine 40 often needs to be run while the boat 10 is out of water (i.e., dry docked).

Figure 2:
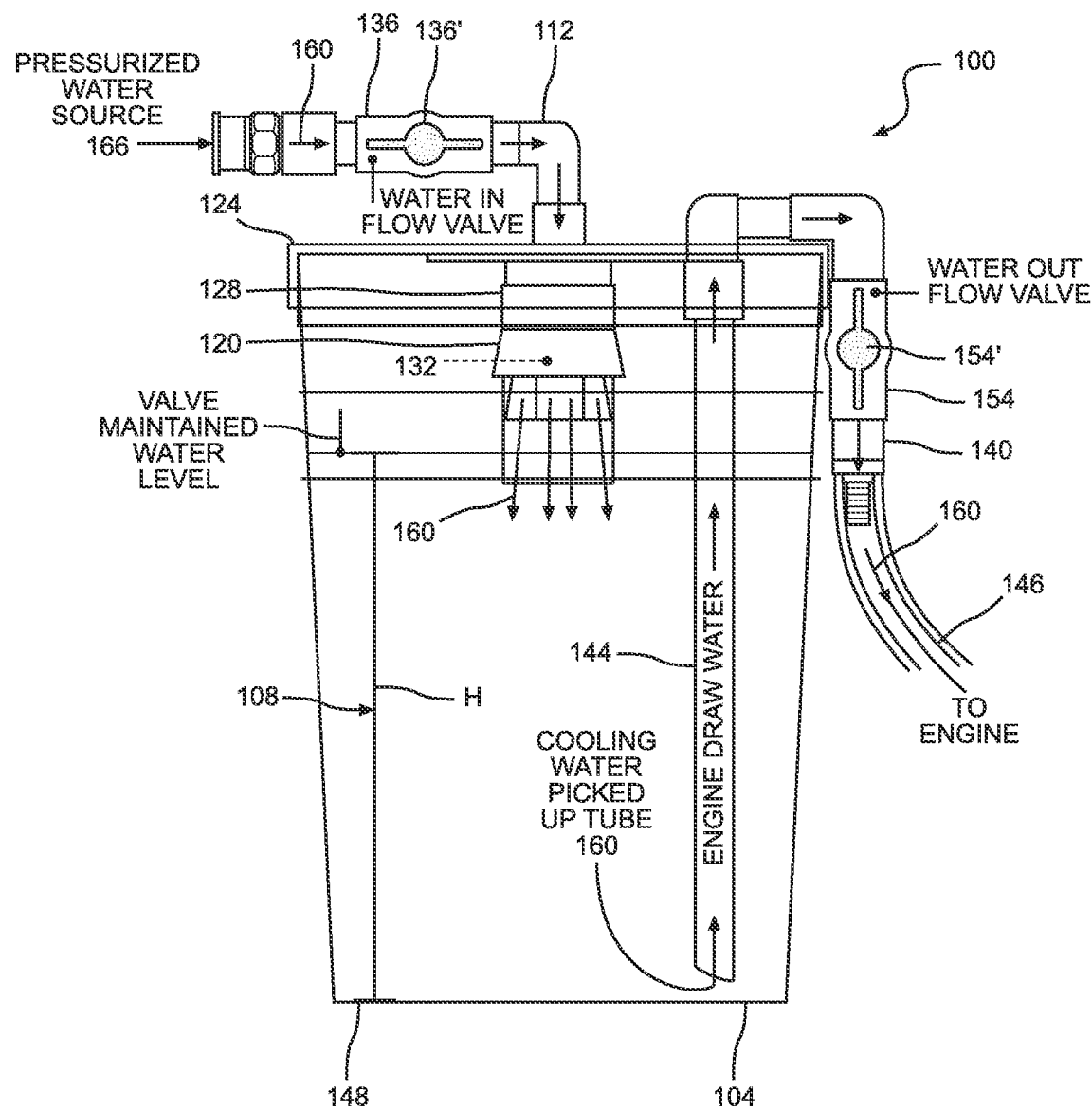
FIG. 2 is a schematic of a service unit according to one embodiment of the invention.
Figure 3:
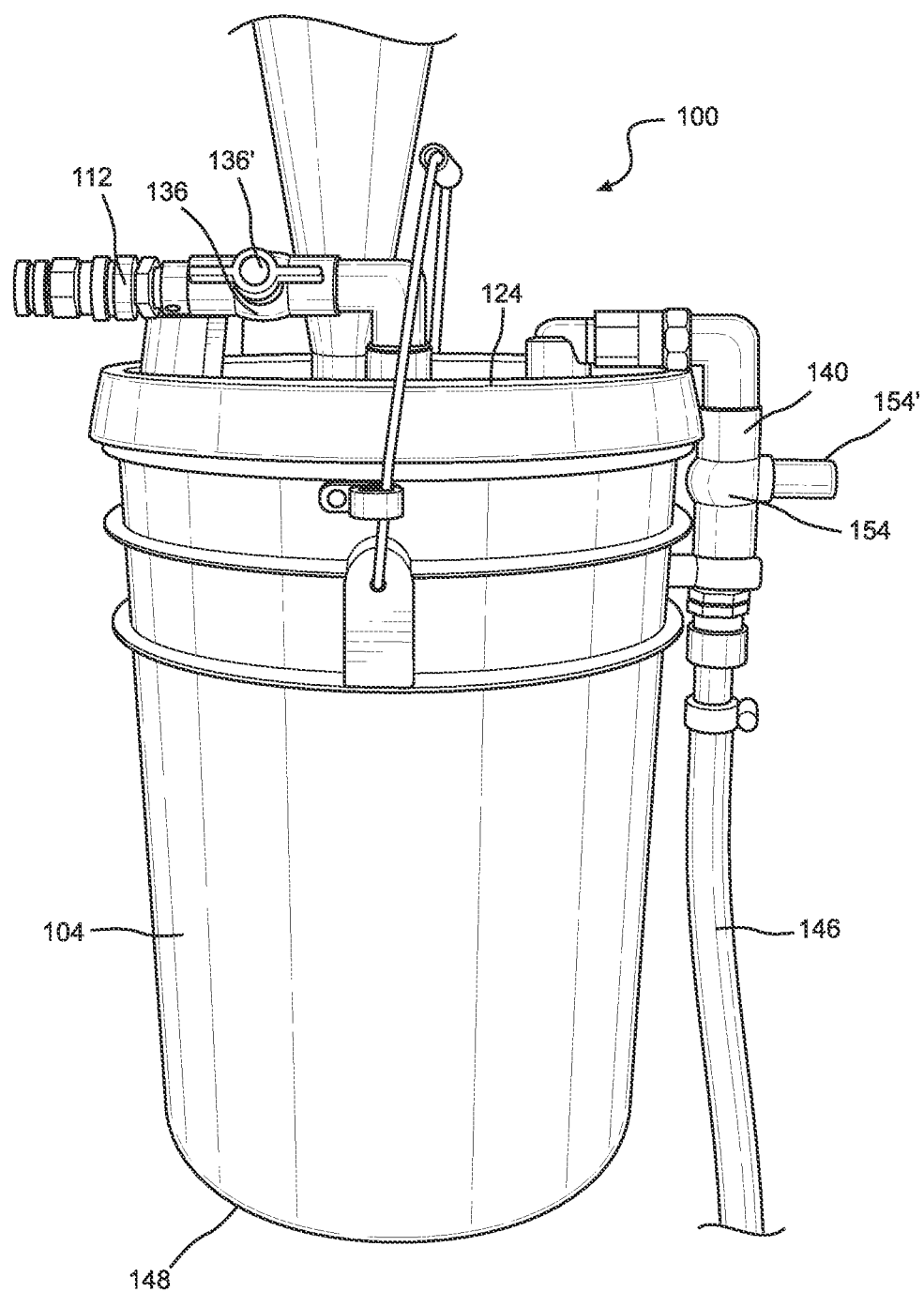
FIGS. 3 and 4 are perspective views of the service unit of FIG. 2.
Figure 4:
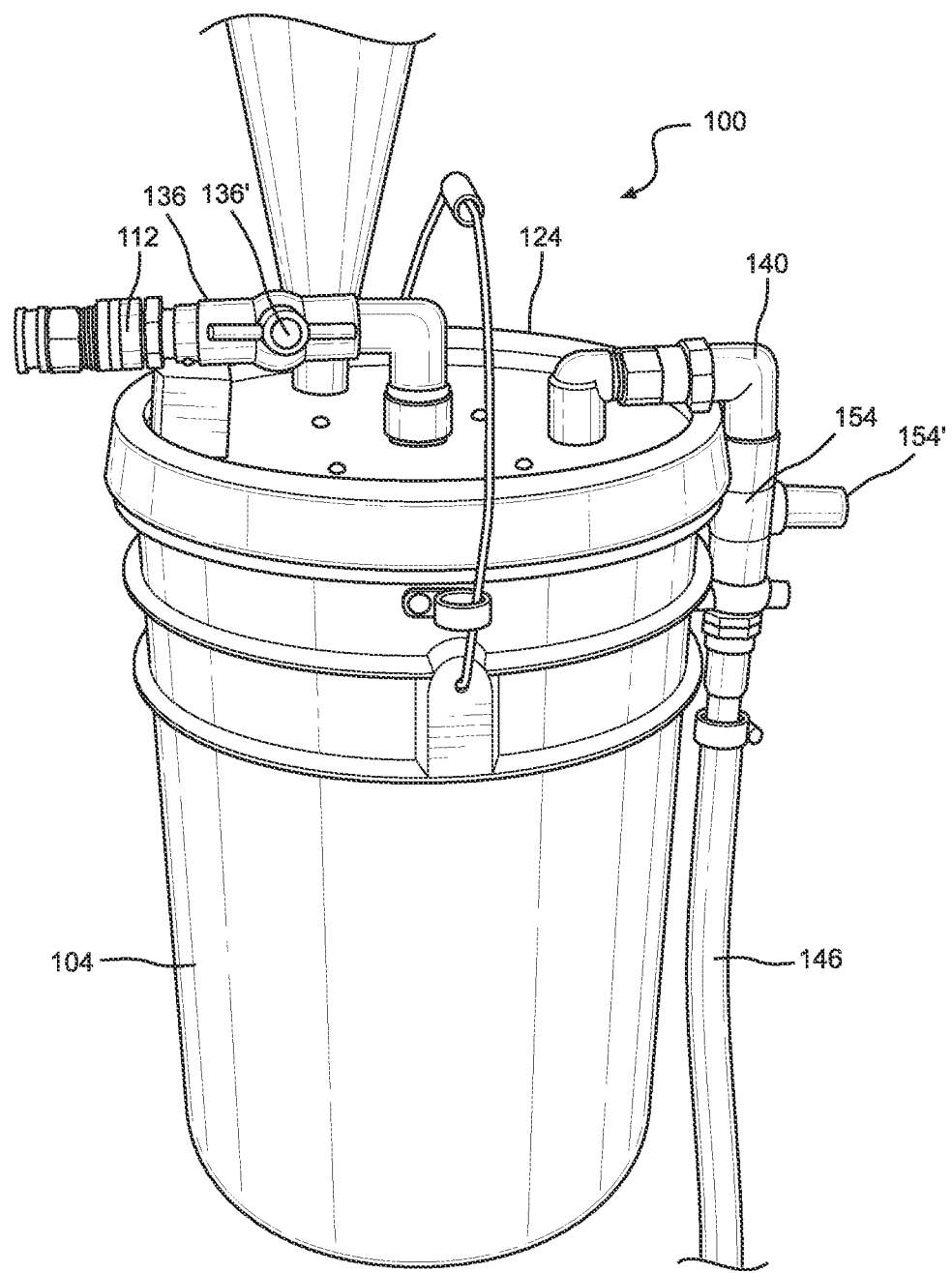

FIGS. 2-4 illustrate a service or maintenance unit 100 that provides an unpressurized fluid source for running inboard engines 12 that are positioned at or below the water line 20. The service unit 100 includes a sealed container or vessel 104 that defines a chamber 108 that is configured to receive unpressured fluid such as water or antifreeze, for example. A first or inlet conduit 112 is coupled to the vessel 104 and is configured to guide the fluid from an inlet 116 to the chamber 108. The inlet 116 is configured to matingly receive a hose. A valve 120 is coupled to the inlet conduit 112. The valve 120 is positioned at a first end 124 of the vessel 104 within the chamber 108 and is configured to selectively allow fluid to pass therethrough. In the illustrated embodiment the valve 120 is a Hudson-type valve that includes a float 128 and a control diaphragm chamber 132. The valve 120 will allow fluid to flow therethrough until a predetermined amount of fluid is received within the chamber 108 such that the fluid reaches a bottom of the valve 120 (e.g., a height H above the bottom 148 of the vessel 304). In other embodiments, the valve 120 may include other valve types.

The illustrated service unit 100 is a vessel 104 that can receive up to six gallons of fluid therein. In the illustrated embodiment, the predetermined amount of fluid is approximately 5 gallons, which is the amount of fluid that the vessel 104 can accommodate before the fluid level contacts a bottom of the valve 120. When the fluid level contacts the bottom of the valve 120, the float 128 inside of the valve 120 rises, thereby allowing the diaphragm chamber 132 to fill and close the valve 120. In additional or alternative embodiments, the vessel 104 may be any be configured to receive more or less fluid and the predetermined fluid amount may be greater or less than what is discussed above. For example, the vessel 104 may be able to receive 2-10 gallons of fluid with a predetermined fluid level of approximately 1.75 gallons to 9.75 gallons. Additionally, the valve 120 is responsive to fluid pressures in the range of 12-65 psi. Further, in additional or alternative embodiments, the valve 120 may have a different configuration.

The inlet conduit 112 includes a first or inlet control flow valve 136 that is configured to determine a flow rate of fluid that passes from the inlet 116 to the valve 120. A second or outlet conduit 140 is coupled to the first end 124 of the vessel 104. An extension member 144 is coupled to a first end of the outlet conduit 140 and extends from substantially the first end 124 of the vessel 104 substantially to a second, opposite end 148 of the vessel 104. A hose 146 may extend from a second end of the outlet conduit 140. The outlet conduit 140 includes a second or outlet flow control valve 154 that is configured to determine a flow rate of fluid that passes from the vessel 104 through to the outlet conduit 140. In the embodiment illustrated FIGS. 2-4, each of the flow control valves 136, 154 is a ball valve, for example, and includes an actuator 136', 154' that is adjustable to determine how much fluid is able to flow therethrough. In other embodiments, however, the flow control valves 136, 154 may be other suitable types of valves. Additionally, the flow control valves 136, 154 of FIGS. 2-4 are the same type of valve, however, in other embodiments, they may be different types of valves. For example, in the embodiment illustrated in FIG. 9, the first flow valve 333 is a ball valve and the second flow control valve 354 is a Venturi-type valve, which will be discussed in greater detail below.

The service unit 100 is assembled by providing and sealing the vessel 104. The inlet conduit 112 is coupled to the vessel 104 such that it is in fluid communication with chamber 108. The outlet conduit 140 is also coupled to the vessel 104 such that it is in fluid communication with the chamber 108. A fluid passageway 160 is therefore defined from the inlet 116 through the inlet conduit 112, the chamber 108, and the outlet conduit 140. Additionally, the method includes coupling the valve 120 to the inlet conduit 112 within the chamber 108 such that the valve 120 is configured to prevent the fluid from entering the chamber 108 when the predetermined amount of fluid is reached within the chamber 108. Further, the first flow control valve 136, which selectively determines the flow rate through the inlet conduit 112, and the second flow control valve 154, which selectively determines the flow rate through the outlet conduit 140, are both coupled to the service unit 100.

Figure 5:
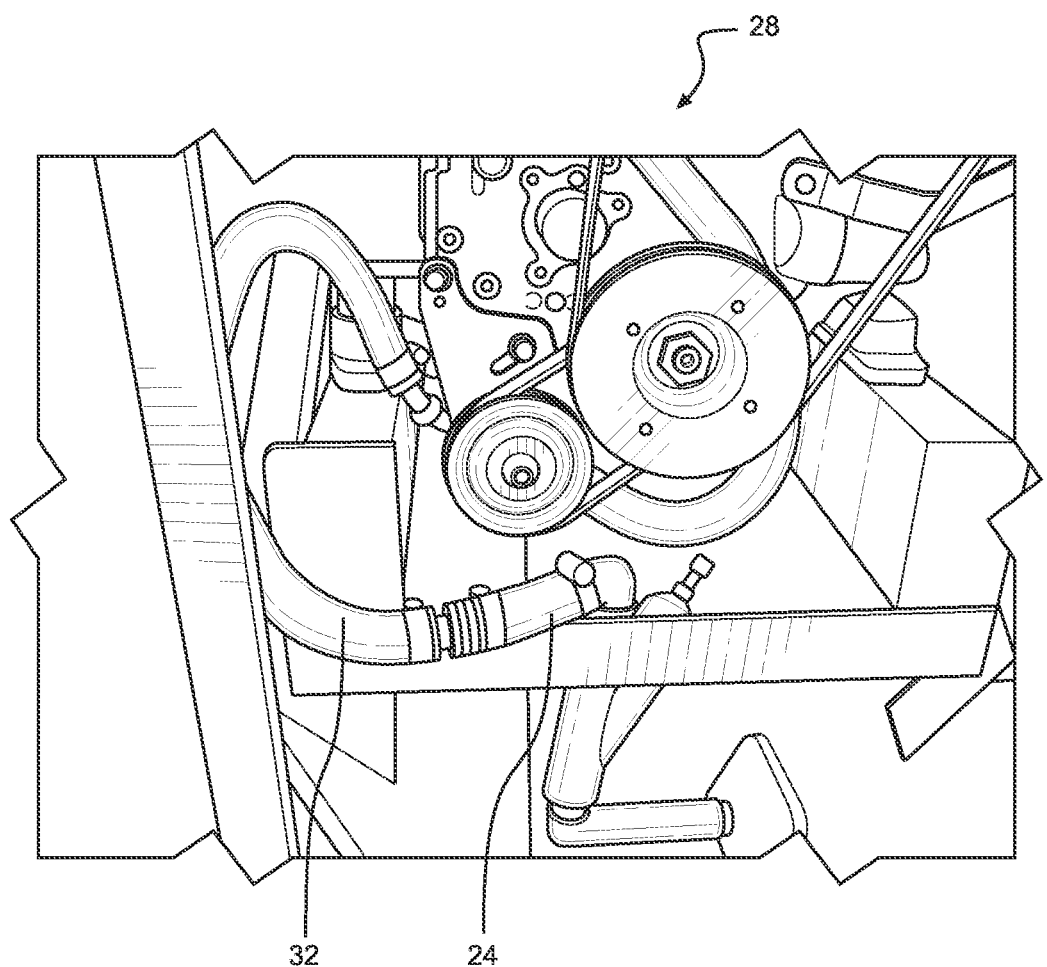
FIG. 5 is a perspective view of an exemplary inboard marine engine
Figure 6:
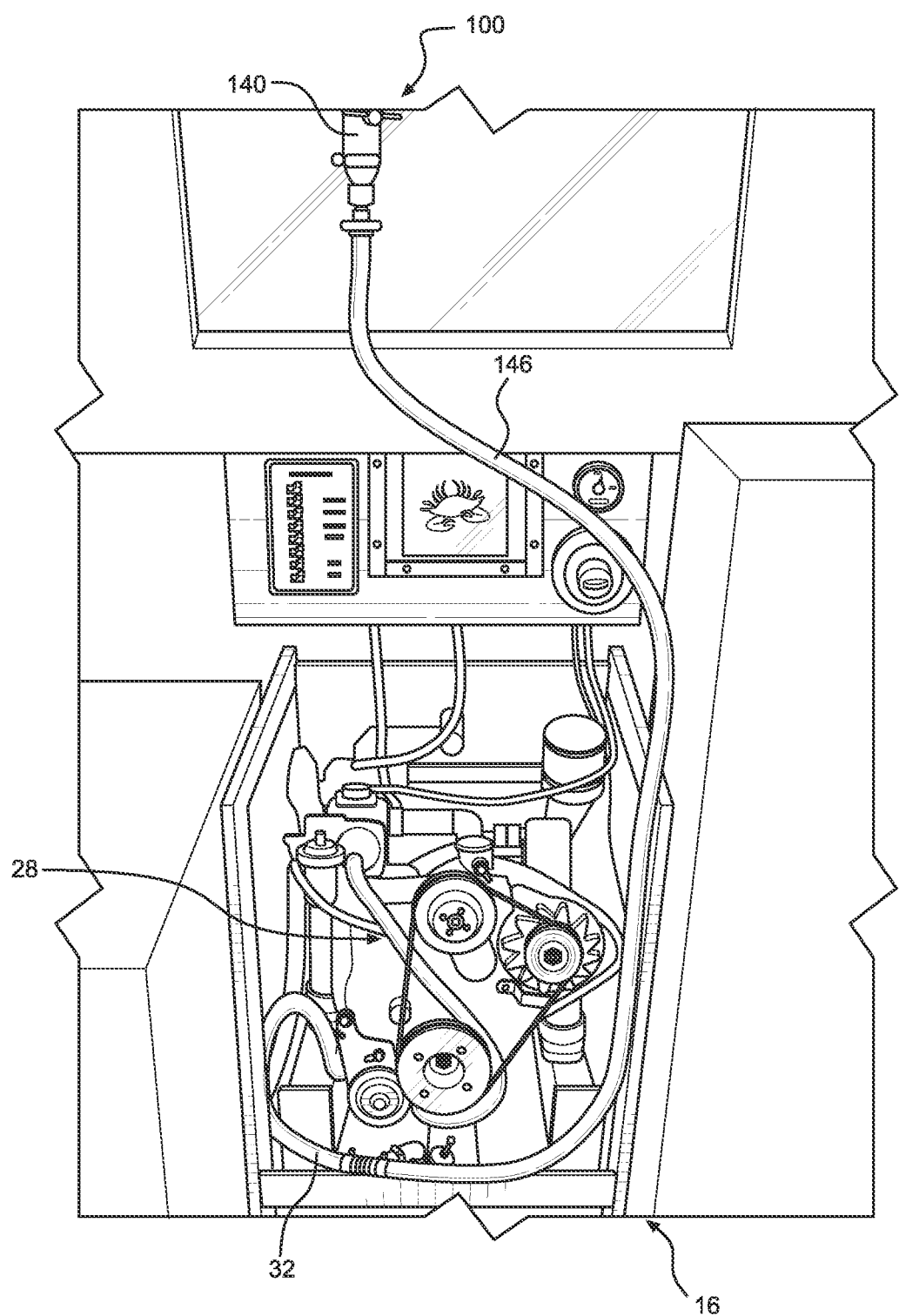
FIGS. 6 and 7 are perspective views of the service unit of FIGS. 3 and 4 coupled to the engine of FIG. 5.
Figure 7:
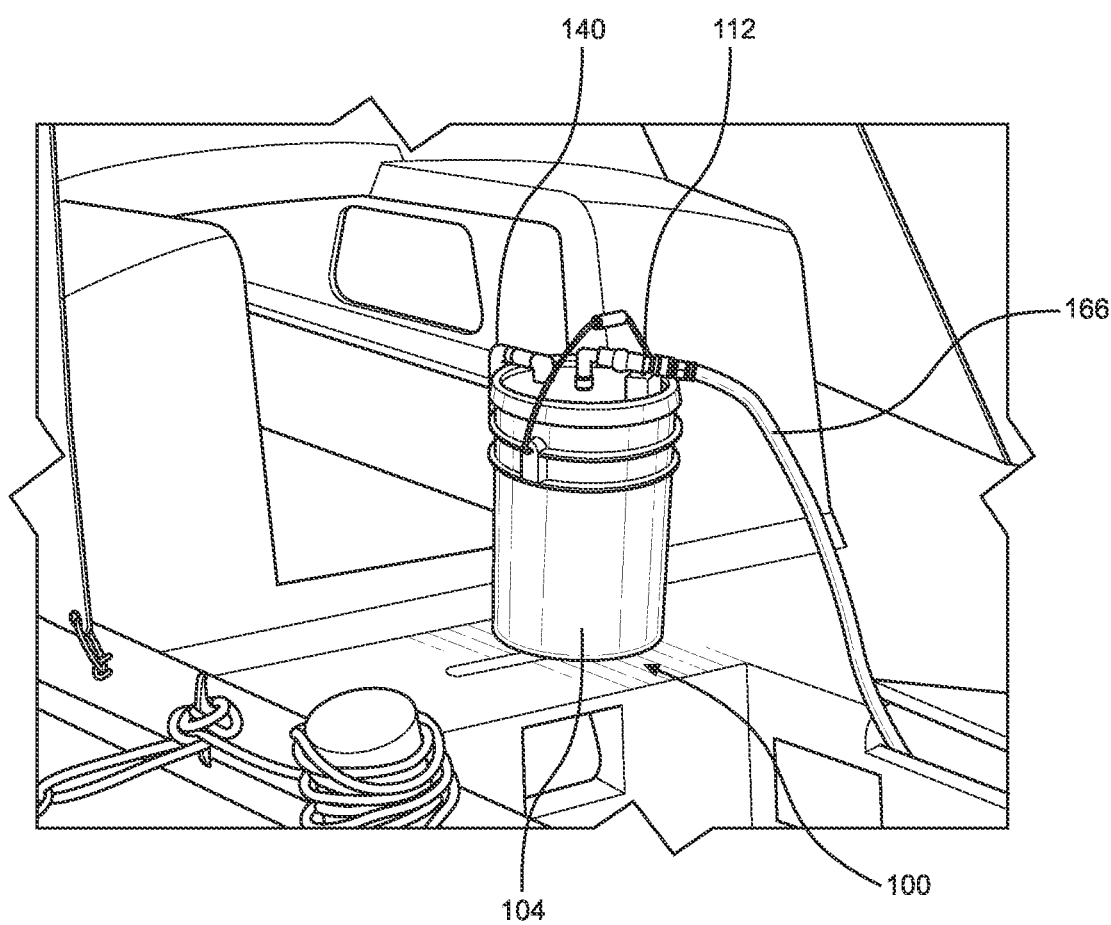
Figure 8:
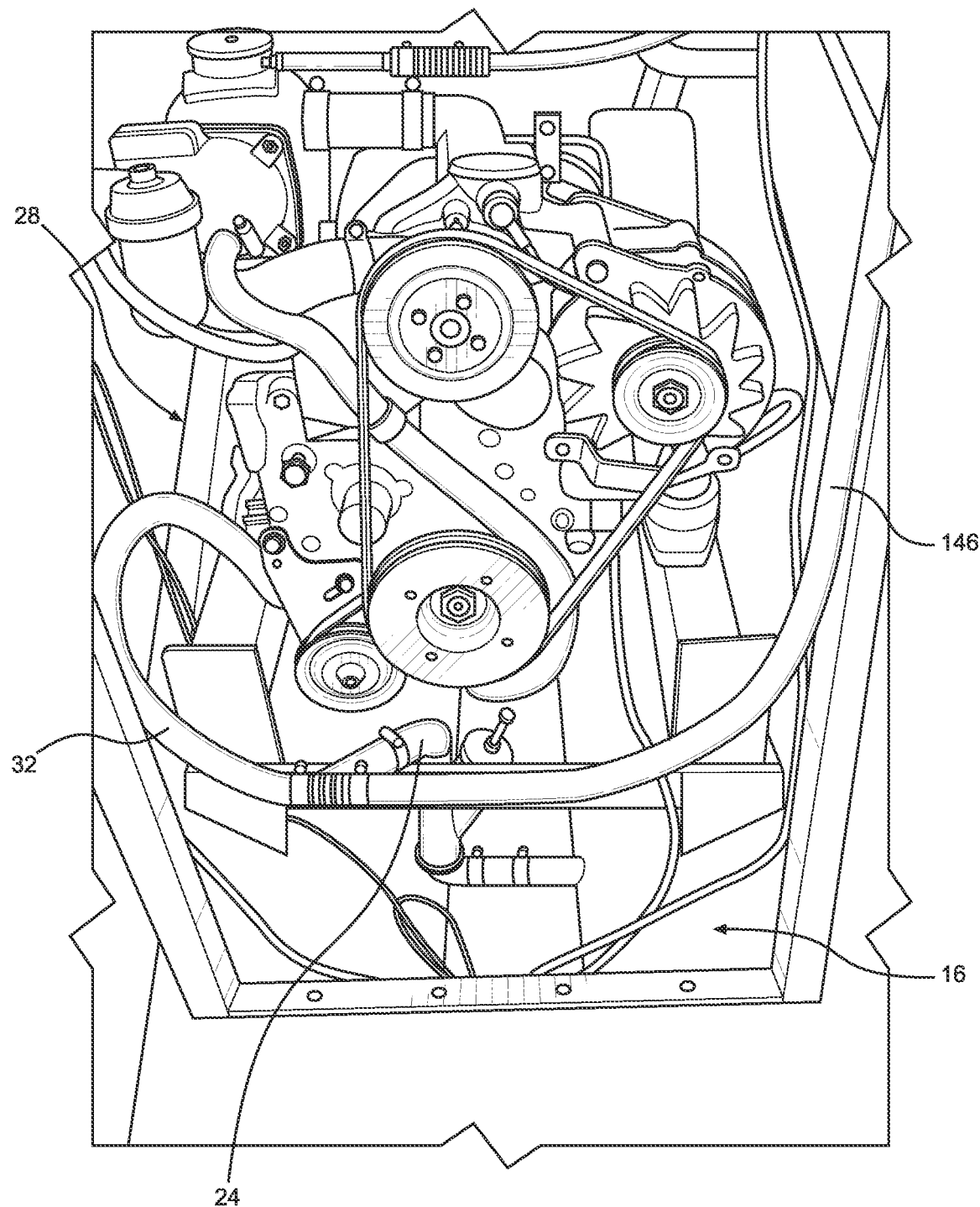
FIG. 8 is a detailed perspective view of FIG. 6.

The service unit 100 is configured to be coupled to the pump 28 of the engine 40 to deliver unpressurized fluid to the engine 40. For example, water from a pressurized water source 166 (i.e., a hose) may be delivered to the pump 28 of the engine 40 via the service unit 100. Prior to use (FIG. 5), the engine 40 is turned off and the pickup hose 24 is uncoupled from the pump 28. The outlet conduit 140 is coupled to the pump 28 of the engine 40 to replace the pickup hose 24. Similarly, the inlet conduit 112 is coupled to the pressurized water source 166 (FIG. 7). The vessel 104 fills with water at a rate in the range of between 5-10 gallons/minute at a pressure in the range of 45-60 psi when the first flow control valve 136 is open and the second flow control valve 154 is closed. For example, the vessel may fill at a rate of 7.5 gallons/minute at a pressure of 50 psi. Once the vessel 104 is filled (or at least partially filled), the second flow control valve 154 is opened. When both the first flow control valve 140 and the second flow control valve 154 are open (or at least partially open), water passes from the vessel 104 to the outlet conduit 140 to the engine 40, while water continues to enter the vessel 104 through the inlet conduit 112. In particular, when the engine 40 is running, water contained within the vessel 104 is taken up by the extension member 144 and the second conduit 140 at a rate that is determined by the type of the pump 28, as described above, such that water moves through the engine 40 normally as described above. The flow rate of water to the vessel 104 can be regulated by adjusting the first flow control valve 136. In particular, the first flow control valve 136 can also be closed or partially closed to either close off the inlet conduit 112 entirely or regulate the flow of water therethrough. Similarly, the flow rate to the engine 40 can be regulated by adjusting the second flow control valve 154. Adjusting the flow control valve 154, and therefore the water rate therethrough, also allows the user to regulate a temperature of the engine as well as a rate of cooling of the same. If the engine 40 is stopped or the second flow control valve 136 is closed water will continue to be delivered to the vessel 104 until the height of the water reaches the bottom of the valve 120 (i.e., the predetermined amount of fluid is reached) at which point the valve 120 will close. In other words, the water will no longer be able to enter the vessel 104 once the height of the water reaches the bottom of the valve 120. In this way, if water is not exiting the vessel 104 through the outlet conduit 140, the vessel 104 will not overflow.

Figure 9:
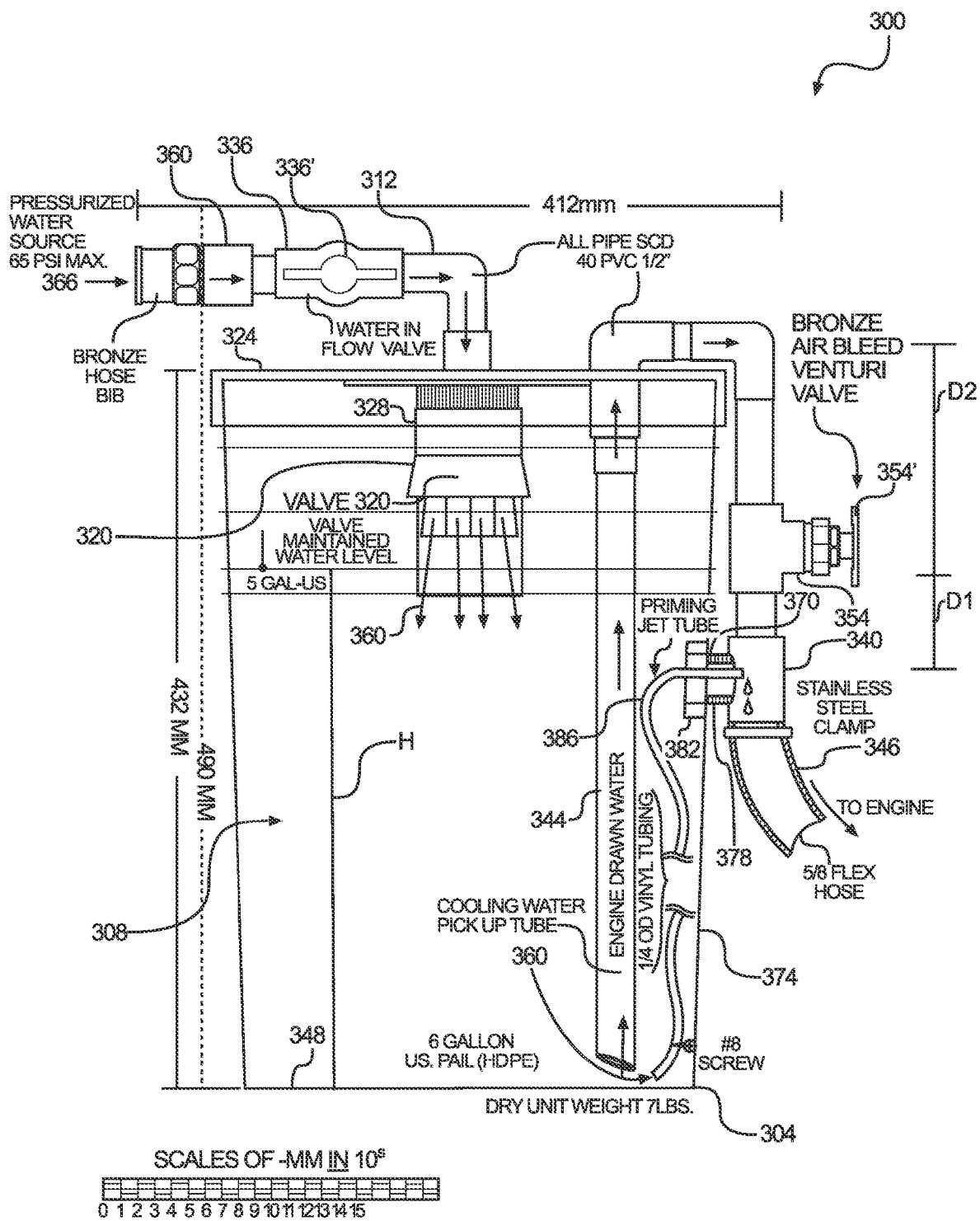
FIGS. 9 and 10 are schematics of service units according to additional embodiments of the invention.

FIG. 9 illustrates a service unit 300 according to another embodiment of the invention. The service unit 300 of FIG. 9 is similar to the service unit 100 of FIGS. 2-4; therefore, like structure will be identified by like reference numerals plus "200" and only the differences will be discussed hereafter.

The service unit 300 includes an opening 370 in a side wall 374 of the vessel 304 that is sealed with a plug or bushing 378 having an orifice 382. In the embodiment illustrated in FIG. 9, the plug 378 is threadingly coupled to the wall 374 of the vessel 304, although in other embodiments, the plug 378 may be coupled to the wall 374 in any suitable way. The plug 378 is positioned within the wall 374 such that the orifice 382 is positioned at distance D below the maximum height H that water can reach within the vessel 304. In the illustrated embodiment, the distance D is approximately 1.0 inches, although in other embodiments the distance may be greater or less than 1.0 inch. For example, the distance D may measure approximately 0.5 inches to 2.0 inches. The plug is sealingly coupled to the outlet conduit 340, which is coupled to the hose 346. A tube or conduit 386 extends from the second end 348 of the vessel 304 through the orifice 382 in the plug 378 such that the tube 386 is in fluid communication with the outlet conduit 340. In the illustrated embodiment, the tube 386 has a diameter of approximately 0.25 inches, however, in other embodiments, the diameter may be between about 0.1 inches and 0.4 inches. The tube 386 is a priming feature used to the prime the pump 28.

Additionally, as discussed above, the second flow control valve 154 is a Venturi-type control valve. The Venturi-type control valve allows small controlled amounts of water flow to reduce by approximately 5 to 10% per turn of valve actuator 354'. Accordingly, the second flow control valve 354 ensures an adjustable flow the pump 28 in gallons per minute. The second flow control valve 354 is an equalizer of water into vessel 304 versus water out of vessel 304. The second flow control valve 354 also doubles as a plumbing siphon break. Having a Venturi-type control valve in to the outlet conduit 340 greatly reduces vacuum related squeezing of the hose 346 during operation.

The service unit 300 is assembled and operated similar to the service unit 100 discussed above. Once the outlet conduit 340 is coupled to the pump 28 of the engine 40 to replace the pickup hose 24 and the inlet conduit 312 is coupled to the pressurized water source 366 (FIG. 7). The vessel 304 fills with water at a rate in the range of between 5-10 gallons/minute at a pressure in the range of 45-60 psi when the first flow control valve 336 is open and the second flow control valve 354 is closed. Once the vessel 104 is filled the water will passively move from the vessel 304 through the tube 386 to the outlet conduit 340. Therefore, because the pump 28 is off and there is no draw therefrom, the water will collect between the pump 28 and the outlet conduit 340 within the hose 346. Water will even fill air bubbles created by removing a strainer (not shown) of the pump and replacing the pick-up hose 24 with the hose 346. In the illustrated embodiment, water will exit the vessel 304 through the tube 386 at a rate of about five to fifteen ounces per minute and preferably at a rate of about ten ounces per minute. Water will enter until it reaches a height H within the conduit 340 that is equal to a water level within the vessel 304 (e.g., the height of bottom of the valve 320). At this point, the pump 28 is primed.

Once the pump 28 is primed, the second flow control valve 154 is opened, the pump 28 starts and water moves through the engine 40 as discussed above with respect the embodiment of FIGS. 2-4. However, because the pump 28 is primed, the pump 28 more easily draws water from the vessel 304 initially because the pump 28 it has a smaller height difference to overcome initially. In particular, because the water in the outlet conduit 340 is equal to the height H of the water within the vessel 304, the pump 28 does not have to overcome a distance D2 between the height H of the water and the outlet conduit 340 adjacent to the first end 324 of the vessel 304. The distance D2 is about 7.0 inches but could be between 0.5 inches and 0.9 inches in other embodiments.

Figure 10:
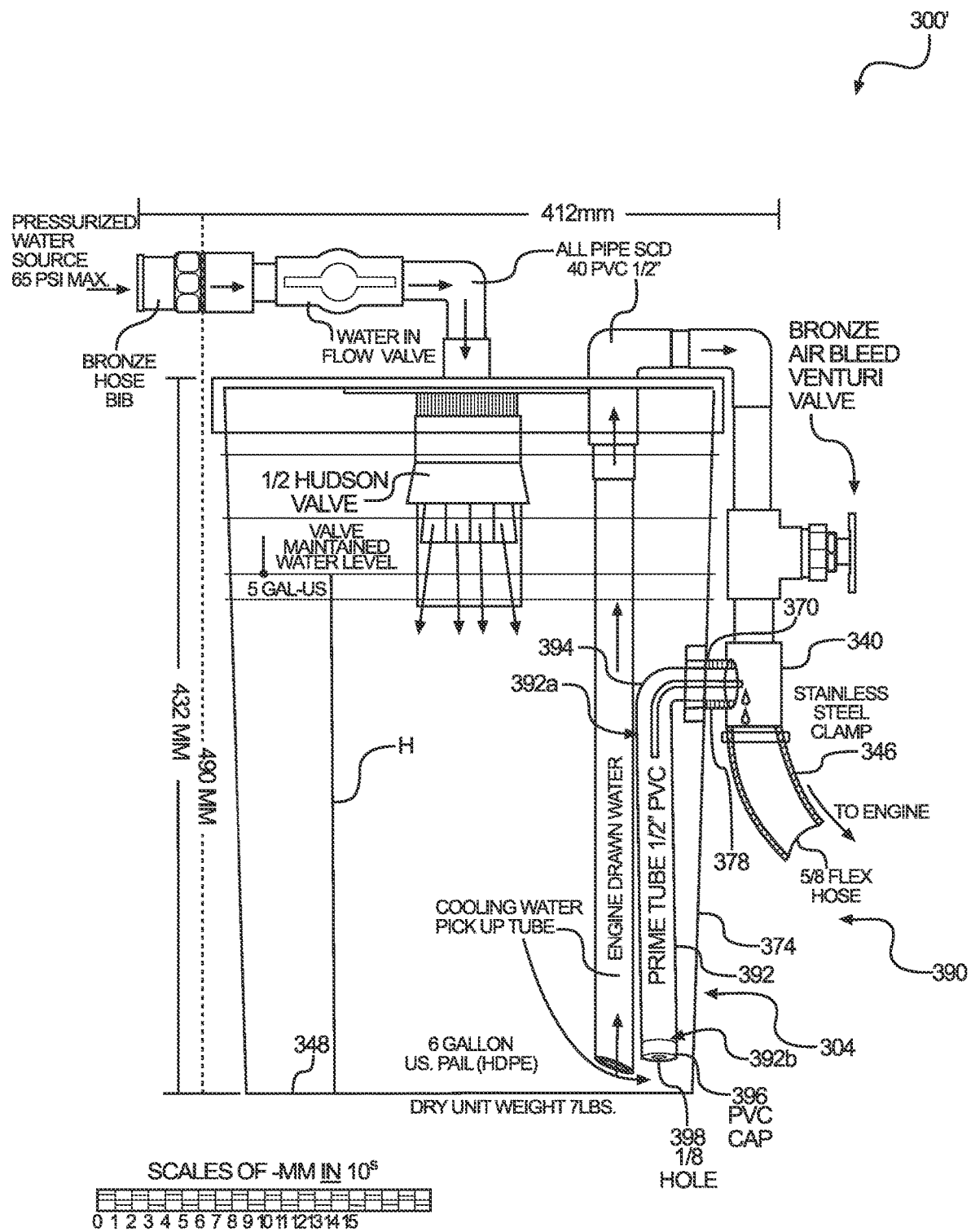

FIG. 10 illustrates a service unit 300' according to another embodiment of the invention. The service unit 300' of FIG. 10 is similar to the service unit 300 of FIG. 9; therefore, like structures will be identified by like reference numerals and only the differences will be discussed hereafter. Specifically, the service unit 300' of FIG. 10 is the same as the service unit 300 of FIG. 9 with the exception that the service unit 300' has a different priming structure.

The service unit 300' includes an opening 370 in a side wall 374 of the vessel 304 that is sealed with a plug or bushing 378 having an orifice 382. In the embodiment illustrated in FIG. 10, the plug 378 is threadingly coupled to the wall 374 of the vessel 304, although in other embodiments, the plug 378 may be coupled to the wall 374 in any suitable way. The plug 378 is positioned within the wall 374 such that the orifice 382 is positioned at distance D1 below the maximum height H that water can reach within the vessel 304. In the illustrated embodiment, the distance D1 is approximately 1.0 inches, although in other embodiments the distance may be greater or less than 1.0 inch. For example, the distance D may measure approximately 0.5 inches to 2.0 inches. The plug is sealingly coupled to the outlet conduit 340, which is coupled to the hose 346. A priming system 390 is connected to the plug 378.

In embodiments, the priming system 390 includes a tube 392 having a first (upper) end 392a and a second (lower) end 392b, an elbow 394 connected to the first end 392a, and a cap 396 connected to the second end 392b. As illustrated in FIG. 10, the elbow is connected to the plug 378 and a hole 398 is provided in the cap 396. In this manner a flow path is defined from the interior of the vessel 304, through the hole 398, the cap 396, the tube 392, the elbow 394, and the plug 378, and into the outlet conduit 340. The priming system 390 thus constitutes a priming feature used to the prime the pump 28 by introducing fluid into the hose 346 before the pump 28 starts running. The components of the priming system 390 (e.g., the tube 392, the elbow 394, and the cap 396) may be constructed using ½ inch PVC pipe components, for example, although other materials and sizes may be used. In embodiments, the components of the priming system 390 are relatively more rigid than the components of the priming system defined by the tube 386 of the service unit 300 of FIG. 9 (which may be constructed of ¼ inch O.D. vinyl tubing, for example).

As shown in FIG. 10, in accordance with aspects of the invention, the service unit 300' is structured and arranged such that both the first end 392a and the second end 392b of the tube 392 are below the maximum height H that water can reach within the vessel 304. As the service unit 300' fills with fluid from the main valve 320 to the waterline (defined by height H), the tube 392 of the priming system 390 is simultaneously filling with the fluid at the same rate (due to the hole 398 in the cap 396). As the level of the fluid in the vessel 304 rises above the elbow 394 and the plug 378, the fluid passes through the plug 378 and into the into the outlet conduit 340 and trickles into the hose 346 (e.g., the fluid fills the pipe/tube through the venturi/jet and pours into the elbow and trickles into the hose), thus priming the pump 28 by providing fluid in the hose 346. Once the unit starts to draw, it will siphon water through both of the tubes and increases the volumentric flow of water to the pump. Thus it aids in the continual flow, and reduces the risk of air being introduced to break the siphon.

While the use of the service units 100, 300, 300' is described as running water therethrough on route to the engine 40, it should be understood that the service units 100, 300, 300' may also guide antifreeze to the engine. For example, during winterization, water will be run through the engine 40 first. Then antifreeze is added to the vessel 104, 304 in order to winterize the engine 40. Antifreeze is passed through the engine until it can be seen in spigots (not shown) of the pump 28, at which point the spigots are shut and the pump 28 is stopped.

The service units 100, 300, 300' may include additional hoses that are configured to couple to the unit. In this way, the service units 100, 300, 300' may be positioned at a variable distance from either the pump or the fluid source.

The service units 100, 300, 300' may also be part of kit that includes a variety of accessories for ease of use. For example, the kit may include all of the parts described above in addition to replacement parts, extra or auxiliary hoses, and the like.

While the service units 100, 300, 300' are described above as being used with an inboard marine engine, it should be understood that the service units 100, 300, 300' may be used in other applications. For example, the service units 100, 300, 300' may be used with any type of engine system that requires cooling fluid to run therethrough. Additionally, the service units 100, 300, 300' may be used for the maintenance and service of plumbing systems (e.g., for the winterization of plumbing systems in homes and buildings). To this end, a service unit in accordance with aspects of the invention is configured to be portable relative to the system to which it is connected (e.g., an engine cooling system in a vehicle such as a boat or auto, a plumbing system in a home or building, etc.). In a preferred embodiment, a service unit in accordance with aspects of the invention is selectively connectable to and disconnectable from the system that is being serviced (e.g., an engine cooling system in a vehicle such as a boat or auto, a plumbing system in a home or building, etc.). In a preferred embodiment, a service unit in accordance with aspects of the invention is configured to be carried by a person onto or near a boat, connected to an engine of the boat in the manner described herein, operated to run fluid through the engine in the manner described herein, disconnected from the engine, and carried off of or away from the boat. In this manner, the service unit is portable relative to the boat and the engine, and is not fixedly connected to (or a permanent fixture on or in) the boat.

Various features and advantages of the invention are set forth in the following claims.

What is claimed is:

1. A service unit comprising:
a vessel including a top wall and an opposing bottom wall, and at least one sidewall extending between the top wall and the bottom wall defining a chamber configured to receive a fluid;
a first conduit coupled to the vessel and in fluid communication with the chamber, the first conduit defining a fluid inlet;
a fluid outlet structure including a second conduit coupled to the vessel and in fluid communication with the chamber and an intake opening within the chamber adjacent the bottom wall of the vessel, wherein in operation the fluid outlet structure draws unpressurized fluid from the chamber upward towards the top wall of the vessel to an outlet of the second conduit;
a valve coupled to the first conduit and positioned within the chamber, wherein the first conduit is coupled to the top wall of the vessel and the valve is configured to define a maximum fluid level in the chamber by preventing the fluid from entering the chamber when a predetermined amount of fluid is reached within the chamber; and
a priming system comprising a priming tube inside the vessel in communication with an opening through the at least one sidewall of the vessel, the opening positioned lower than the maximum fluid level in the chamber, the priming system defining a priming flowpath that extends from a bottom of the priming tube inside the vessel and below the opening, through the opening, and into the second conduit,
wherein the priming flowpath enters the second conduit at a location downstream of a flow control valve in the second conduit and higher than the bottom wall of the vessel; and
wherein the vessel comprises a pail with a carrying handle such that the service unit is configured to be portably carried by a person.

2. The service unit of claim 1, wherein the fluid that is guided from the inlet to the chamber is pressurized.

3. The service unit of claim 1, wherein the fluid outlet structure further comprises an extension member coupled to the second conduit, the extension member extending from the intake opening to the second conduit adjacent the top wall of the vessel.

4. The service unit of claim 1, wherein the second conduit is configured to be coupled to an inboard engine.

5. The service unit of claim 1, wherein the vessel is sealed.

6. The service unit of claim 1, further comprising a flow control valve in the first conduit, wherein the flow control valve in the first conduit and the flow control valve in the second conduit are configured to selectively determine the rate of fluid flow therethrough, wherein each of the respective flow control valves is selected from the group consisting of a ball valve and a Venturi-type valve.

7. The service unit of claim 1, wherein, during operation, a hose connected to the first conduit supplies the fluid to the chamber, and a pump connected to the second conduit draws the fluid from the chamber.

8. The service unit of claim 1, wherein:
the second conduit is configured to be connected to a pump of an inboard engine by a hose; and
the priming system primes the pump by introducing fluid from inside the vessel into the hose that connects the second conduit to the pump before the pump starts running.

9. The service unit of claim 8, wherein after the priming system primes the pump and once the pump starts running, the pump siphons fluid through both the priming tube and an extension tube connected to the second conduit.

10. The service unit of claim 9, wherein the pail is a six gallon pail.

11. A service unit comprising:
a vessel defining a chamber configured to receive fluid;
a first conduit coupled to the vessel and in fluid communication with the chamber, the first conduit defining an inlet; and
a second conduit coupled to the vessel and in fluid communication with the chamber, the second conduit defining an outlet;
wherein the first conduit, the chamber, and the second conduit define a fluid passageway;
wherein the fluid is unpressurized when in the chamber,
further comprising a valve coupled to the first conduit and positioned within the chamber, the valve configured to prevent the fluid from entering the chamber when a predetermined amount of fluid is reached within the chamber,
wherein each of the first and the second conduits includes a flow control valve that is configured to selectively determine the rate of fluid flow therethrough,
each said flow control valve is outside the vessel,
the fluid passageway twice passes through a top of the vessel, and
the valve defines a maximum fluid level above a bottom of the vessel and below the top of the vessel,
further comprising a priming system comprising a priming tube inside the vessel in communication with an opening through at least one sidewall of the vessel, the opening positioned lower than the maximum fluid level, the priming system defining a priming flowpath that extends from a bottom of the priming tube inside the vessel and below the opening, through the opening, and into the second conduit,
wherein the priming flowpath enters the second conduit at a location downstream of the flow control valve in the second conduit and higher than the bottom of the vessel,
wherein the priming system operates to introduce fluid from inside the vessel into a hose that connects the second conduit to a pump of an engine before the pump starts running; and
wherein the vessel comprises a pail with a carrying handle such that the service unit is configured to be portably carried by a person.

12. The service unit of claim 11, wherein the valve coupled to the first conduit and positioned within the chamber is a float valve.

13. The service unit of claim 12, wherein each said flow control valve is a ball valve.

14. The service unit of claim 12, wherein one said flow control valve is a ball valve and another said flow control valve is a Venturi-type valve.

15. The service unit of claim 11, wherein, during operation, a hose connected to the first conduit supplies the fluid to the chamber, and the pump connected to the second conduit draws the fluid from the chamber.

16. The service unit of claim 11, further comprising an extension tube within the chamber and connected to the second conduit, wherein the extension tube extends downward from the top of the vessel toward the bottom of the vessel.

17. The service unit of claim 16, wherein after the priming system introduces fluid into the hose, and once the pump starts running, the pump siphons fluid through both the priming tube and the extension tube.

18. The service unit of claim 17, wherein the pail is a six gallon pail.

19. The service unit of claim 18, wherein the maximum fluid level defines the predetermined amount of fluid to be five gallons.

20. A service unit comprising:
    a vessel comprising a top wall, a bottom wall, and a sidewall defining a chamber configured to receive fluid;
    a first conduit outside the vessel, the first conduit connected to the top wall and defining an inlet by which a fluid enters the chamber;
    a float valve connected to the first conduit, the float valve positioned within the chamber, the float valve defining a maximum fluid level above the bottom wall of the vessel by preventing the fluid from entering the chamber when a predetermined amount of fluid is reached within the chamber;
    a second conduit outside the vessel, the second conduit connected to the top wall and defining an outlet by which the fluid exits the chamber;
    an extension tube connected to the second conduit, the extension tube positioned within the chamber and extending from the top wall downward toward the bottom wall;
    a first flow control valve that controls a flow of the fluid in the first conduit;
    a second flow control valve that control a flow of the fluid in the second conduit; and
    a priming system comprising a priming tube inside the vessel in communication with an opening through the sidewall of the vessel;
    wherein the opening is lower than the maximum fluid level,
    wherein an inlet of the priming tube is lower than the opening,
    wherein the priming system defines a priming flowpath that extends from the inlet of the priming tube, through the opening, and into the second conduit,
    wherein the priming flowpath enters the second conduit at a location lower than the second flow control valve in the second conduit and higher than the bottom of the vessel,
    wherein the first conduit, the float valve, the chamber, the extension tube, and the second conduit define a main flowpath between (i) a first hose of a pressurized fluid source that is connected to the first conduit and (ii) a second hose connected between an outlet of the second conduit and a water pump of a boat engine, and
    wherein the vessel comprises a pail with a carrying handle such that the service unit is configured to be portably carried by a person.

21. The service unit of claim 20, wherein, while the first flow control valve is open and the second flow control valve is closed, the fluid enters the chamber via the first conduit and fills the chamber to the maximum fluid level.

22. The service unit of claim 21, wherein, while the first flow control valve is open and the second flow control valve is closed, the priming system primes the pump by introducing the fluid from inside the vessel into the second hose before the water pump starts running.

23. The service unit of claim 22, wherein, after the fluid fills the chamber to the maximum fluid level, and while the first flow control valve is open and the second flow control valve is open, the pump draws the fluid through both the extension tube and the priming tube while the fluid continues to enter the vessel via the first conduit.

24. The service unit of claim 23, wherein the service unit has dry weight of seven pounds or less such that the service unit is configured to be portably carried by a person.

* * * * *